United States Patent [19]

Loebert

[11] Patent Number: 4,674,717
[45] Date of Patent: Jun. 23, 1987

[54] AIRCARFT WING

[75] Inventor: Gerhard Loebert, Baldham, Fed. Rep. of Germany

[73] Assignee: Messerschmitt-Boelkow-Blohm Gesellschaft mit beschraenkter Haftung, Munich, Fed. Rep. of Germany

[21] Appl. No.: 888,082

[22] Filed: Jul. 16, 1986

Related U.S. Application Data

[63] Continuation-in-part of Ser. No. 678,574, Dec. 5, 1984, abandoned.

[30] Foreign Application Priority Data

Dec. 14, 1983 [DE] Fed. Rep. of Germany ....... 3345154

[51] Int. Cl.⁴ ............................................. B64C 21/04
[52] U.S. Cl. .................................................... 244/207
[58] Field of Search ................ 244/199, 200, 207, 208

[56] References Cited

U.S. PATENT DOCUMENTS

| | | | |
|---|---|---|---|
| 1,903,818 | 4/1933 | Jutting | 244/207 |
| 2,277,175 | 3/1942 | Wagner | 244/207 |
| 2,302,925 | 11/1942 | Von Schlippe | 244/207 |
| 2,973,922 | 3/1961 | Davidson et al. | 244/207 |
| 3,018,983 | 1/1962 | Davidson | 244/15 |
| 3,154,267 | 10/1964 | Grant | 244/15 |
| 3,161,377 | 12/1964 | Balluff | 244/207 |
| 3,938,760 | 2/1976 | Hoeppner et al. | 244/12.5 |
| 4,036,452 | 7/1977 | Schairer | 244/1 N |

FOREIGN PATENT DOCUMENTS 3033101 3/1982 Fed. Rep. of Germany ...... 244/207

OTHER PUBLICATIONS

"Zeitschrift Fuer Flugwissenschaften", Feb. 1962, pp. 46 to 65; (Z. Fulgwiss. 10. Jahrgang, Heft 2; by F. Thomas.
"Airplane Performance Stability and Control" by Courtland D. Perkins and Robert E. Hage, pp. 117 to 153, Pub. by J. Wiley & Sons, Inc.

Primary Examiner—Joseph F. Peters, Jr.
Assistant Examiner—Rodney Corl
Attorney, Agent, or Firm—W. G. Fasse; D. H. Kane, Jr.

[57] ABSTRACT

An aircraft wing is equipped with at least one low compression fan which blows into a longitudinal flow channel extending lengthwise or spanwise of the wing and leading into air blowing nozzle arranged along the upper wing surface where the reduced pressure is largest for directly mixing the propulsion air jet or jets with the boundary layer air flowing along and adjacent to the upper wing surface. Both, the flow channel and the air blowing nozzles extend substantially along the entire length of the wing for increasing the resulting propulsion force and/or the resulting lift due to the mixing of the propulsion air jet with the boundary layer air directly in the boundary layer.

7 Claims, 10 Drawing Figures

AIRCARFT WING

This application is a continuation-in-part of application Sr. No.: 678,574, filed 12/5/84 now abandoned.

FIELD OF THE INVENTION

The invention relates to an aircraft wing constructed for increasing the resulting propulsion force and/or the resulting lift by mixing the propulsion jet with the air flow near the wing surface, especially the upper wing surface.

DESCRIPTION OF THE PRIOR ART

German Patent Publication (DE-OS) No. 3,033,101 discloses an aircraft wing of this type. According to this German Patent Publication the propulsion jet is mixed with the friction free flow above the wing surface and outside of the boundary layer. This concept achieved a reduction in the air drag which in turn resulted in fuel savings. However, in addition to reducing the drag, it should be possible to also increase the resulting force component of the propulsion force and of the lift.

OBJECTS OF THE INVENTION

In view of the above it is the aim of the invention to achieve the following objects singly or in combination:

to further improve the fuel consumption by reducing the air drag still further;

to make use of the aerodynamic knowledge that each disturbance of the momentum loss thickness of the wing boundary layer is amplified if this disturbance occurs in a zone of high reduced pressure since it has been shown that the drag effect of rivet heads, sheet metal overlaps, and so forth is substantially larger on the upper or wing suction side than on the lower or wing compression side; and to assure a mixing of the propulsion air with the boundary layer air directly in the boundary layer substantially along the entire wing length in the spanwise direction.

SUMMARY OF THE INVENTION

According to the invention the above objectives have been achieved by providing the wing with one or more low pressure fans, the exhaust air of which is passed through a longitudinal channel and a longitudinal gap for blowing directly into the boundary layer in a zone on the upper wing surface where the largest or maximal reduced pressure prevails so that the mixing of the propulsion jet air with the boundary layer air takes place in this zone of maximal reduced pressure.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
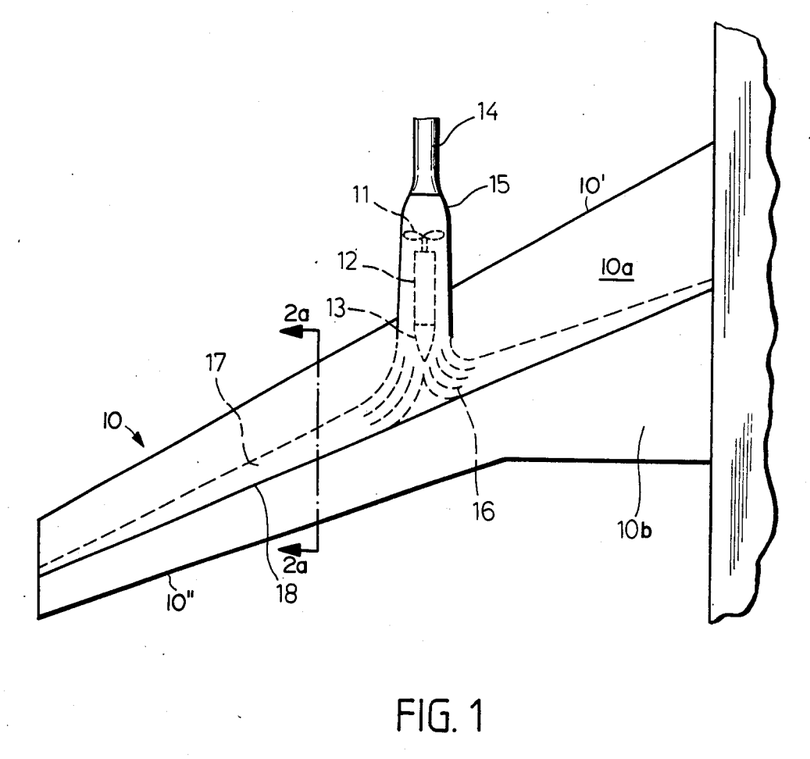
FIG. 1 is a schematic top plan view of a wing according to the invention.

FIG. 1 discloses a simplified illustration of a top plan view of a wing constructed according to the invention. The wing 10 comprises a leading edge 10' and a trailing edge 10''. Air blower slot means 18 are arranged in the top or upper surface of the wing 10 and extend substantially along the entire length of the wing in the direction of the wing span. The air blower slot or slots 18 are located in a zone where the reduced pressure on top of the wing surface has its largest value. This zone divides the front portion 10a of the upper wing surface from the rear portion 10b of the upper wing surface. A flow pipe or air intake 14 leads into an air inflow housing 15 wherein a conventional gas turbine 12 with blower vanes 11 is mounted for sucking air into the wing. The air coming through the inlet flow pipe 14 is precompressed in the freestream before it is further compressed by the blower vane 11 and is ejected into a longitudinal air flow channel 17 leading into the air blower slot or slots 18 and guided by the guide vanes 16 and an air guide cone 13. This precompression has the advantage that it takes place substantially without any pressure loss as compared to the pressure loss caused by a conventional diffuser. One or more low pressure fans may be provided along each wing of an aircraft.

Figure 2A:
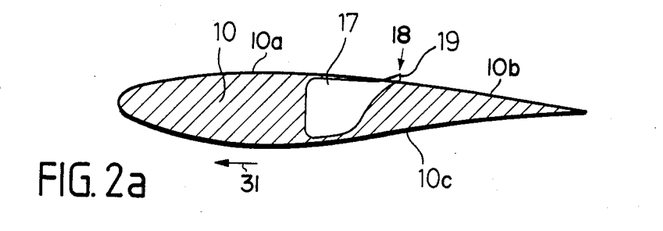
FIG. 2a is a sectional view along section line 2a—2a in FIG. 1, whereby it is to be understood, that the wing itself is not a solid body, the hatching being only used to contrast a longitudinal flow channel in the wing.

FIG. 2a shows the longitudinal air flow channel 17 in the wing 10 having an under or compression surface 10c. The channel 17 leads into the air blow nozzles 19 arranged in a row to form the slot means 18.

Figure 2B:
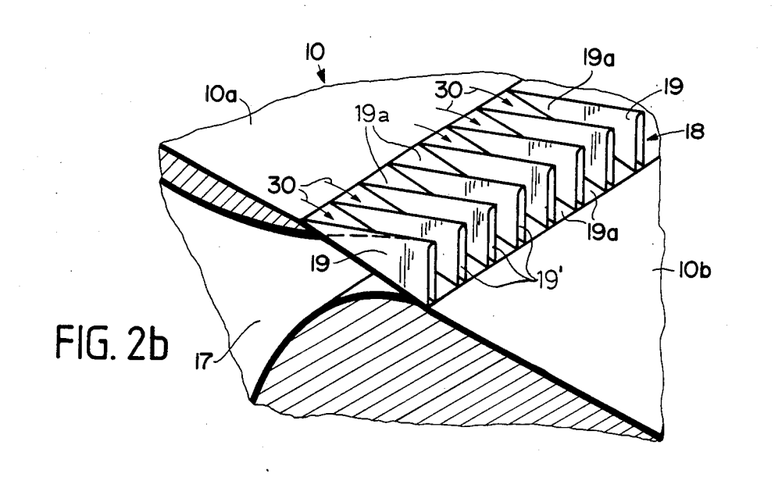
FIG. 2b is a perspective view, partially in section, of a wing portion on an enlarged scale to illustrate a plurality of air blower slots arranged in a row alongside the top surface of the wing.

FIG. 2b shows, on an enlarged scale the nozzles 19 in a perspective illustration, whereby the nozzle slots 19' extend substantially upright relative to the upper surface 10a, 10b of the wing 10. The blow nozzles 19 are spaced from each other to form flow channels 19a for the boundary layer air flow indicated by the arrows 30 along the suction surface areas 10a, 10b. The flow channel 17 leads into the blow nozzles 19 and out through the nozzle slots 19' which face backwards relative to the travel direction of the wing indicated by the arrow 31 in FIG. 2a. For the above stated purpose of blowing directly into the boundary layer, the blow nozzles 19 have an upright height corresponding to less than the thickness of the boundary layer.

Figure 2C:
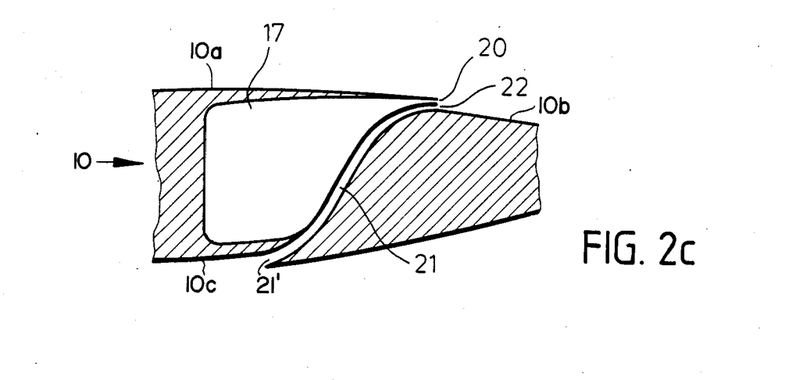
FIG. 2c is a view similar to that shown in FIG. 2a, however, illustrating an alternate embodiment of the invention.

In FIG. 2c the air flow channel 17 leads into a single substantially uninterrupted longitudinal slot 20 which is symbolically indicated at 18 in FIG. 1. Additionally, an air guide duct 21 having its intake 21' in the compression or lower surface 10c of the wing leads into a longitudinal slot 22 extending below and substantially in parallel to the slot 20 out of the flow channel 17. Both slots 20 and 22 extend substantially along the entire wing length in the spanwise direction.

According to the invention all the slot nozzles are so arranged that they have a vertical height just sufficient for directly blowing the discharge air or propulsion jet of the blower 11, 12 into the boundary layer substantially along the entire wing length. This blowing takes place in the zone of the largest reduced pressure on the suction side 10a, 10b of the wing. An aerodynamic analysis has shown that a wing drag reduction of about 20% may be realized by the just described features providing a respective thrust increase for a representative suction surface speed distribution on a wing constructed according to the invention, whereby a further fuel reduction of about 5% may be achieved as compared to the above mentioned prior art as represented by said German Patent Publication.

Another advantage of the just described embodiments according to the invention is seen in that the pressure on the upper suction side of the wing may be further reduced without any boundary layer separation. This feature has the further advantage that the wing can be constructed thicker for a given cruising speed Mach number.

The following calculations will show that the invention is practically achievable. First, a borderline or limit case will be analyzed by considering a jet adjacent to the wing surface and having a disappearingly small or negligible mass flow. Then the case will be examined which involves a jet of finite mass flow, whereupon the effectiveness of boundary layer jet mixing on the suction side of the wing surface will be estimated.

The following symbols will be used.

$C_{FRef}$: $F_{Ref}/(\frac{1}{2}P V_\infty^2 \iota)$ reference thrust coefficient;
$C_{WP}$: profile drag coefficient of the upper wing suction side;
$\Delta C_{WP}$: reduction of the profile drag coefficient by means of jet blowing;
f: jet impulse loss ratio (see equation 9);
$F_{Ref}$: reference thrust;
$h_\infty$: $\dot{m}_S/(P V_\infty)$ compressor inlet cross-section per unit wing span;
$\Delta h$: $\dot{m}_S/(P V_S)$ equivalent jet height;
H: $\delta_1/\delta_2$ from or shape factor;
$\iota$: wing chord;
$\dot{m}_S$: $= p\Delta h V_S$ jet mass flow per unit wing span;
$P_{oS}$: total jet pressure;
$P_{o\infty}$: total onflow pressure;
P: fan drive power;
Re: Reynolds number;
$Re_{\delta 2}$: $= Re \cdot \delta_2/\iota$;
V: flow speed at the outer edge of the boundary layer;
$V_\infty$: air speed;
$V_S$: jet exit speed;
$V_{S\infty}$: jet speed of the reference propulsion plant;
$V_*$: V in the jet exit plane;
$\Delta W_P$: reduction in the profile drag by means of jet blowing;
X: distance from the leading edge of the wing profile measured parallel to the profile chord;
X*: in accordance with the jet exit plane;
$\delta_1$: displacement thickness of the boundary layer;
$\delta_2$: momentum loss thickness of the boundary layer;
$\delta_{2K}$: $\delta_2$ directly upstream of the jet exit cross-section;
$\delta_{2S}$: modification of $\delta_2$ by the jet;
$\Delta \delta_2^X$: effective change of $\delta_2$ by the jet;
$\Delta \delta^x{}_{2\ ideal}$: momentum loss thickness of the jet in the jet exit cross-section;
$\eta_F$: Propulsive efficiency (see equation 16); Perkins, C. D. and Hage R. E.: Airplane Performance Stability and Control, p. 142. John Wiley and Sons, New York, 1949.
$\eta_V$: blower or compressor efficiency;
$\rho$: air density;
$\tau_0$: wall shear stress
Index → relates to:
H: the trailing edge of the wing profile
K: the kink location in the speed distribution curve.

As mentioned, first we shall analyze the wing profile having a slightly disturbed turbulent boundary layer. As is known, the momentum loss thickness of the turbulent boundary layer may be calculated as follows when it is assumed that the flow is incompressible and not separated from the surface:

$$\frac{\delta_2(X)}{\iota} = \frac{0.0366}{Re^{0.2}} \left[\frac{V_\infty}{V(X)}\right]^{3.4} \left[\int_{\frac{X}{\iota}}^{\frac{X}{\iota}} \left(\frac{V}{V_\infty}\right)^4 d\frac{X}{\iota} + 62.5 \left(\frac{\delta_2^*}{\iota}\right)^{1.25} Re^{0.25} \left(\frac{V_*}{V_\infty}\right)^{4.25}\right]^{0.8} \quad \text{EQUATION (1)}$$

In this equation X*, $\delta^*_2$ and V* relate to any random or desired point of the contour located in the zone of the turbulent boundary layer.

The factor $$\left[\frac{V_\infty}{V(X)}\right]^{3.4}$$

in Equation (1) shows that a contribution to the momentum loss thickness produced in a zone of high reduced pressure is amplified to the same extent as $V(X)^{-3.4}$ downstream of the reduced pressure zone.

The drag of a profile side or surface is expressed by Equation (2)

$$C_{WP} = 2 \frac{\delta_{2H}}{\iota} \left(\frac{V_H}{V_\infty}\right)^{3.2} \quad \text{EQUATION (2)}$$

and is calculated from Equations (1) and (2) as follows.

$$C_{WP} = \frac{0.074}{Re^{0.2}} \left(\frac{V_\infty}{V_H}\right)^{0.2} \left[62.5 \left(\frac{\delta_2^*}{\iota}\right)^{1.25} Re^{0.25} \left(\frac{V_X}{V_\infty}\right)^{4.25} + \int_{\frac{X^*}{\iota}}^{1} \left(\frac{V}{V_\infty}\right)^4 d\frac{X}{\iota}\right]^{0.8} \quad \text{EQUATION (3)}$$

In calculating the boundary layer it is customary to assume that the factor $$\frac{(V_\infty)}{(V_H)^{0.2}}$$

is equal to 1.0.

If now the momentum loss thickness $\delta_2^*$ is reduced by the value $-\Delta\delta_2^*$ by the blowing out of a weak jet adjacent to the wall, the drag coefficient of the profile surface is reduced as follows.

$$-\Delta C_{WP} = -2{,}41 \frac{\Delta\delta_2^*}{\iota} \left(\frac{\delta_2^*}{C_{WP}\iota}\right)^{0{,}25} \left(\frac{V_X}{V_\infty}\right)^{4{,}25} \quad \text{EQUATION (4)}$$

As may be seen, the largest drag reduction is achieved when the jet is blown out at the rear end of the zone of largest or maximum reduced pressure.

Figure 3A:
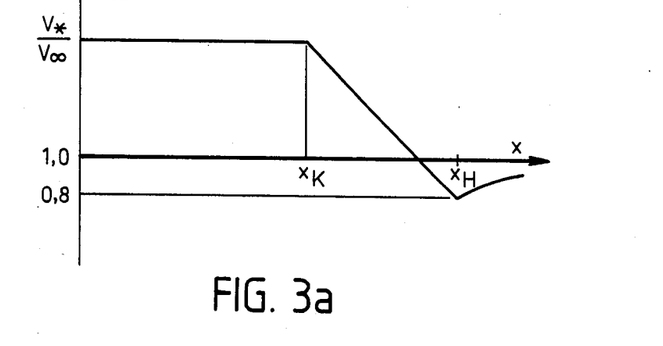
FIG. 3a shows a diagram of the speed distribution characteristic.

When the boundary layer is fully turbulent, the ratio of $\delta_2^* C_{WP}\iota$ depends only on the speed distribution $V/V_\infty(X/\iota)$ and on $X^*/\iota$. Equation (5) applies to the speed distribution shown in FIG. 3 for $X^* = X_K$, $V^*/V_\infty = 1.5$ and $X_K/\iota = 0.6$ $$\left(\frac{\delta_2^*}{C_{WP}\iota}\right)^{0{,}25} \quad 0{,}79 \quad \text{EQUATION (5)}$$

The dependency of this value from $V^X/V_\infty$, $X^K/\iota$ and $X^*/\iota$ is relatively small due to the fact that the exponent in Equation (5) is small.

Using Equation (5) in Equation (4) we obtain Equation (6)

$$-\Delta C_{WP} = -1{,}90 \frac{\Delta\delta_2^*}{\iota} \left(\frac{V_X}{V_\infty}\right)^{4{,}25} \quad \text{EQUATION (6)}$$

A wall jet, namely a jet flowing along the wall or surface of the wing having the height $\Delta h$, and which is blown out with the speed $V_S$ reduces the impulse loss thickness of the boundary layer by $$-\Delta\delta_{2ideal}^* - \Delta h \frac{V_S}{V_X}\left(\frac{V_S}{V_X} - 1\right) \quad \text{EQUATION (7)}$$

It is further known that the wall jet loses some of its initial momentum due to wall friction during the spreading of the wall jet. This momemtum loss is expressed as follows.

$$\Delta\delta_2^*{}_{ideal}(0.15 + 0.85 V_X/V_S) \quad (8)$$

This momentum loss is the smaller the faster the momentum is transmitted from the jet into the boundary layer. Stated differently, the larger the relative differential speed $$\frac{(V_S - V_X)}{V_X}$$

is selected, the smaller will be the momentum loss.

There are several possibilities to avoid the high jet momentum loss of the simple wall jet. For example, if the intensity of the jet mixing with the boundary layer is increased by a suitable shape of the nozzle, the jet speed is reduced along a shorter distance than without a properly shaped nozzle. Thus, the wall friction is also reduced.

Another possibility of avoiding or reducing the high jet momentum loss is to keep the jet separated from the wall surface with the aid of an air layer having a low flow speed, until the speeds in the jet have been noticeably reduced. This insulating air layer may be obtained in the simplest way by detouring the flow near the wing lower surface or compression side to the upper wing side or suction side as shown in FIG. 2c.

One of the most effective methods for reducing skin friction involves blowing the jet through a number or row of upright slot nozzles arranged for guiding the jet directly or exclusively into the boundary layer as shown in FIG. 2b. In that case the contact between the jet and the wing surface is limited to a fraction of the jet circumference. This arrangement of the slot nozzles also is amenable to further reducing the wall friction and thus drag by a more intensive jet mixing with the boundary layer air flow.

We define the jet impulse loss ratio f as follows.

$$f = \frac{\text{momentum loss of the jet close to the surface}}{\text{momentum loss of the wall jet}} \quad \text{EQUATION (9)}$$

Accordingly, the effective reduction of the momentum loss thickness of the boundary layer downstream of the nozzle is obtained as follows.

$$\Delta\delta_2^* - \Delta\delta_2^*{}_{ideal}[1 - f(0.15 + 0.85 V_X/V_S)] \quad (10)$$

The reduction in the profile drag by $\Delta W_p$ by means of jet blowing is calculating as follows, thereby using Equations (6) and (10)

$$-\Delta W_P = 0{,}15 \rho V_\infty^2 \left(\frac{V_X}{V_\infty}\right)^{4{,}25} \Delta h \frac{V_S}{V_X}\left(\frac{V_S}{V_X} - 1\right) [1 - f(0{,}15 + 0{,}85\, V_X/V_S)] \quad \text{EQUATION (11)}$$

If we initially disregard the pressure losses in the supply guide channels, it is necessary to provide a certain power P for the production of the blowing air as follows.

$$p = (p_{oS} - p_{o\infty})\Delta h V_S/\eta_v - \tfrac{1}{2}\rho(V_S^2 - V_X^2)\Delta h V_S/\eta_V \quad \text{EQUATION (12)}$$

This equation is now compared with a reference propulsion plant which is assumed to be located at a large distance from the wing. If the reference propulsion plant produces with the same power P a free jet having the speed $V_{S\infty}$, then this reference propulsion plant would generate a net reference thrust $F_{ref}$, assuming the same fan efficiency $\eta_V$, as follows $$F_{Ref} = \frac{2}{V_{S\infty} + V_\infty} \cdot \eta_\nu P - \frac{\rho \Delta h V_S (V_S^2 - V_X^2)}{V_{S\infty} + V_\infty} \quad \text{EQUATION (13)}$$

Rewriting Equation (13) in a dimensionless form provides the reference thrust coefficient as follows.

$$C_{FRef} = 2 \frac{\Delta h}{\iota} \frac{V_S}{V_\infty} \left( \frac{V_S^2}{V_\infty^2} - \frac{V_X^2}{V_\infty^2} \right) \Big/ \left( \frac{V_{S\infty}}{V_\infty} + 1 \right) \quad \text{EQUATION (14)}$$

The ratio of the drag reduction $-\Delta W_P$ to the reference thrust $F_{Ref}$, is referred to as the thrust amplification factor which is obtained from Equation (15)

$$\frac{-\Delta W_P}{F_{Ref}} = \quad \text{EQUATION (15)}$$

$$0.95 \left( \frac{V_X}{V_\infty} \right)^{2.25} \frac{\frac{V_{S\infty}}{V_\infty} + 1}{\frac{V_S}{V_\infty} + \frac{V_X}{V_\infty}} [1 - f(0.15 + 0.85\, V_X/V_S)].$$

Figure 4:
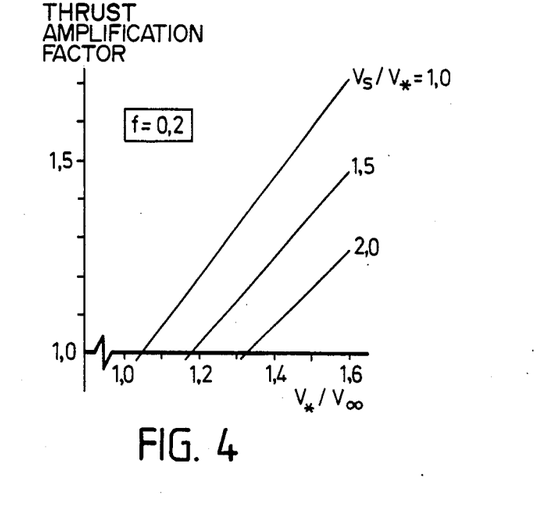
FIG. 4 shows a diagram of the thrust amplification factor when the boundary layer is only slightly disturbed.

FIG. 4 shows the dependency of this thrust amplification factor from $V_*/V_\infty$ and from $V_S/V_*$ for $f=0.2$ and $V_{S\infty}/V_\infty = 1.5$. The last mentioned value corresponds to the jet speed ratio of modern turbo-fan propulsion plants under cruise flight conditions. A substantiation of the assumed jet momentum loss factor f is not possible since for the nozzle arrangements shown in FIGS. 2a, 2b, and 2c there are no measured values available. However, the assumed value will hardly be exceeded because, due to the shown nozzle shapes, the direct interaction between the jet and the wall is practically eliminated. As may be seen, the thrust increase in the borderline case $V_S \rightarrow V_*$ is proportional to the excess speed $V_* - V_\infty$. This shows that the thrust increasing effect of the jet blowing has a direct relationship with the added drag which is inherent in a profile having a finite thickness and camber as compared to a flat plate. The reduction of the thrust amplification with the increase in the ratio $V_S/V_*$ or with the blower pressure ratio is substantially explainable by the reduction in the Froude efficiency. The Froude efficiency $\eta_F$ is expressed as follows for a fan in an undisturbed freestream.

$$\eta_F = \frac{2V_\infty}{V_\infty + V_{S\infty}} = \frac{2}{1 + \sqrt{\frac{P_{OS} - P_{O\infty}}{\frac{1}{2}\rho V_\infty^2} + 1}} \quad \text{EQUATION (16)}$$

Figure 5:
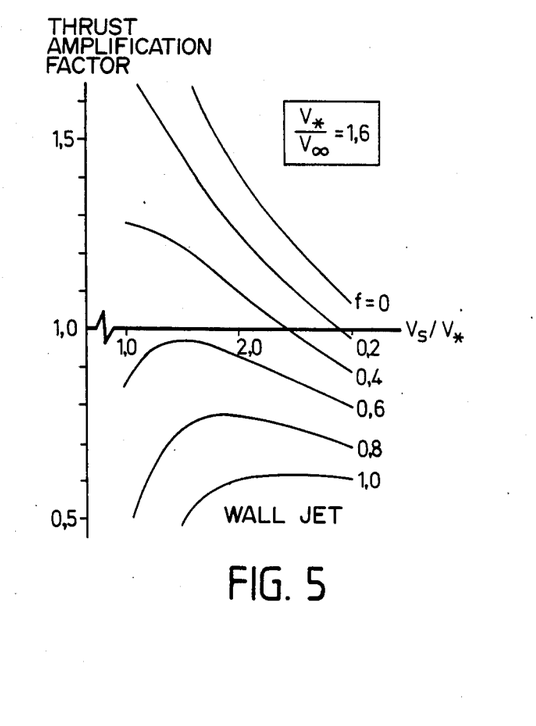
FIG. 5 shows the influence of the jet momentum loss which is dependent on friction, on the thrust amplification factor.

FIG. 5 shows for $V_*/V_{S\infty} = 1.6$ the influence of the jet momentum loss factor f on the thrust amplification. It is clearly apparent that a thrust increasing effect is achievable only if one succeeds in noticeably reducing the high wall friction of the wall jet.

Figure 3B:
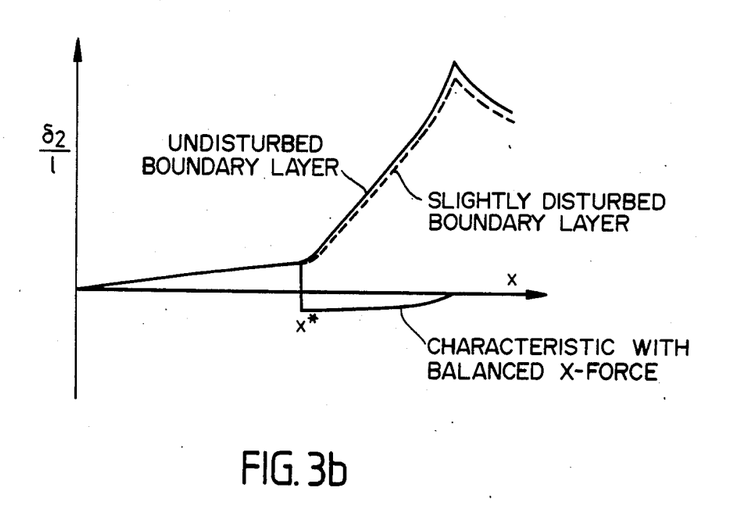
FIG. 3b is a diagram of the momentum loss thickness with and without jet blowing.

In the following the wing profile will be treated which has a jet blow out adjacent to the wall surface of the wing profile with a balanced force in the x-direction (so-called X-force). A fully turbulent boundary layer and the speed profile shown in FIG. 3b are assumed. According to Equation (1) the momentum thickness at the point $X = X_K$ is $$\delta_{2k} = \frac{0.0366(X_k/l)^{0.8}}{Re^{0.2}(V_*/V_\infty)^{0.2}} l. \quad \text{EQUATION (17)}$$

In the point $X = X_K$ a jet close to the wall having the mass flow $$\dot{m}_S = \rho \Delta h V_S \quad \text{(18)}$$

is blown into the boundary layer with the speed $V_S$. As a result, the momentum loss thickness is reduced by the value $$-\delta_{2S} = \Delta h \frac{V_S}{V_*} \left( \frac{V_S}{V_*} - 1 \right) [1 - f(0.15 + 0.85\, V_X/V_S)]. \quad \text{EQUATION (19)}$$

In Equation (19) the momentum loss due to an increased wall friction has been taken into account already.

After the jet has passed through a distance corresponding to several nozzle widths, the momentum loss thickness assumes the value $\delta_{2K} + \delta_{2S}$. In the range $X_K < X < \iota$ the momentum loss thickness is negative throughout, because when the x-force is balanced, $\delta_{2H}$ is equal to zero, see FIG. 3b. Thus, Equation (1) which is applicable only for positive values of $\delta_2$ is not usable for the range or distance $X_K < X < X_H$. An alternate relationship for the calculation of the momentum loss thickness is obtained if one integrates the momentum equation of the boundary layer as follows.

$$\frac{d\delta_2}{dx} + (2 + H) \frac{\delta_2}{V} \frac{dV}{dx} = \frac{\tau_o}{\rho V^2} \quad \text{EQUATION (20)}$$

whereby $(2+H)$ is assumed as a constant as is usual, and whereby additionally it is assumed that $\tau_o/(\rho V^2)$ has a value independent of the location along the X-axis. These assumptions are well justified because the wall shearing stress referenced to the dynamic or impact pressure hardly changed in the rearward profile zone. Under these assumptions we obtain instead of Equation (1), Equation (21)

$$\frac{\delta_2(X)}{\iota} = \quad \text{EQUATION (21)}$$

$$\left( \frac{\tau_o}{\rho V^2} \right) \left[ \frac{V_\infty}{V(X)} \right]^{2+H} \int_{\frac{X_K}{\iota}}^{\frac{X}{\iota}} \left( \frac{V}{V_\infty} \right)^{2+H} d\left( \frac{X}{\iota} \right) +$$

$$\frac{\delta_2^*}{\iota} \left[ \frac{V_*}{V(X)} \right]^{2+H}$$

Therefore, the momentum loss thickness at the trailing edge of the wing is calculated as follows $$\frac{\delta_{2H}}{\iota} = \left( \frac{\delta_{2K}}{\iota} + \frac{\delta_{2S}}{\iota} \right) \left( \frac{V_2}{V_H} \right)^{2+H} + \quad \text{EQUATION (22)}$$

-continued $$\left(\frac{\tau_o}{pV^2}\right)\left(\frac{V_\infty}{V_H}\right)^{2+H} \int_{\frac{X_K}{\iota}}^{1}\left(\frac{V}{V_\infty}\right)^{2+H} d\left(\frac{X}{\iota}\right)$$

The factor $\tau_o/(PV^2)$ is calculated as follows $$\frac{\tau_o}{pV^2} = \frac{0.0128}{Re_{\delta2}^{0.25}} \quad \text{EQUATION (23)}$$

In this case the $\delta_2$ is the momentum loss thickness which is present when there is no propulsion at $$X = \frac{(X_K + X_H)}{2}.$$

Based on measured results made by Thomas, F.; Untersuchunger über die Erhöhungdes Auttriebes von Tragflügeln mittels Grenzschichtbeeinflussung durch Ausblasen. Zelitschrift für Flugwissenschaften (ZFW) Vol. 10 (1962), No. 2, p. 46 the value 3.0 is used for (2+H) rather than the usual value 3.4.

When the force in the X-direction (X-force) is balanced, $\delta_{2H}$ becomes zero. With the aid of this condition it is possible to calculate the jet force and one obtains

EQUATION (24)

$$\frac{\Delta h}{\iota} \frac{V_S}{V_*}\left(\frac{V_S}{V_*} - 1\right)[1 - f(0.15 + 0.85\, V_*/V_S)] =$$

$$\frac{0.0366(X_K/\iota)^{0.8}}{Re^{0.2}(V_X/V_\infty)^{0.2}} + \frac{0.0293}{Re^{0.2}}\left(\frac{V_\infty}{V_*}\right)^3\left[\frac{V\left(\frac{X_K}{2}+\frac{X_H}{2}\right)}{V_\infty}\right]^{0.85} \frac{\int_{X_*}^{1}\left|\iota\left(\frac{V}{V_\infty}\right)d\frac{X}{\iota}\right|}{\left[\int_0^{X_*}\frac{2}{2}+\frac{X_*}{2}\left(\frac{V}{V_\infty}\right)^4 d\frac{X}{\iota}\right]^{0.2}}$$

Figure 6:
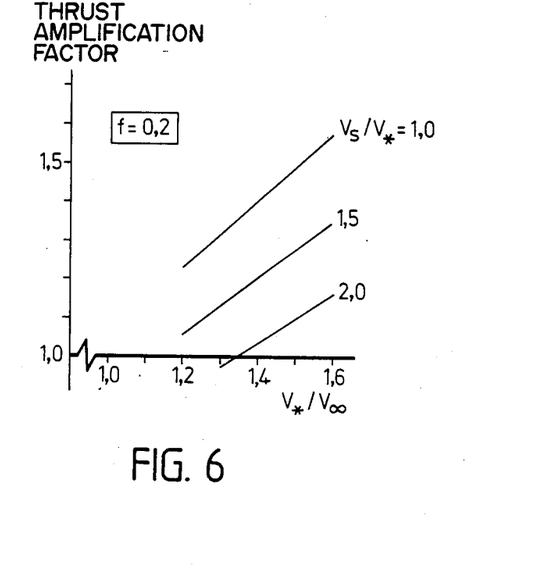
FIG. 6 shows the thrust amplification factor when the force in the x-direction is balanced or equalized.

Taking the reference thrust according to Equation (14) and the drag reduction calculated with the aid of Equation (3) we obtain $$-\Delta C_{WP} = C_{WP} = \quad \text{EQUATION (25)}$$

$$\frac{0.074}{Re^{0.2}}\left[\int_0^1 \left(\frac{V}{V_\infty}\right)^4 d\frac{X}{\iota}\right]^{0.8}\left(\frac{V_\infty}{V_H}\right)^{0.2}$$

which in turn yield the relationship for the thrust amplification factor compares the diagram of FIG. 6 with that of FIG. 4, it becomes apparent that the thrust amplification for a finite jet flow is somewhat smaller than in the case of a weak jet flow.

For calculating the fuel savings it is suitable to relate the positive interference force $-\Delta C_{WP}-C_{FRef}$ to the profile drag on the suction side of the wing. Thus, one obtains

EQUATION (27)

$$\frac{\text{interference force}}{W_P} = 1 - \left(\frac{-\Delta C_{WP}}{C_{FRef}}\right)^{-1}$$

When estimating the possible fuel savings for transport aircraft it is to be mentioned that, basically, the effectiveness of blowing out of the suction side can be determined only with a sufficient accuracy by experiment. The calculated estimate can be subject to errors for the following reasons. It is not certain that the results of an aerodynamic analysis performed for incompressible flows can be transferred to the cruising flight condition. It is also not certain whether the integral boundary layer calculation methods can be applied to boundary layers having a negative momentum loss thickness. The size or value of the jet momentum losses is not certain because corresponding measured results are not yet available. Therefore, in the following estimate of the effectiveness of the wing construction according to the invention the jet momentum loss factor f has been assumed intentionally on the conservative side to be f=0.2.

The analysis which has been performed shows that the thrust amplification becomes the larger the smaller the fan compression ratio and thus the value of $V_S/V_*$ is be selected. On the other hand, the fan air mass flow and thus also the nozzle surface and the flow speed in the flow channels increases strongly if $V_S$ approaches $V_*$ and the X-force is balanced.

EQUATION (26)

$$\frac{-\Delta C_{WP}}{C_{FRef}} = \frac{\left[1 - f\left(0.15 + 0.85\frac{V_*}{V_S}\right)\right]\left(\frac{V_\infty}{V_*}\right)^{0.8}\cdot\frac{V_{S\infty}+V_\infty}{V_S+V_*}\left(\frac{V_\infty}{V_H}\right)^{0.2}\left[\int_0^1\left(\frac{V}{V_\infty}\right)^4 d\frac{X}{\iota}\right]^{0.8}}{\left(\frac{X_K}{\iota}\right)^{0.8}+0.08\left(\frac{V_\infty}{V_*}\right)^{2.8}\cdot\left[\frac{V\left(\frac{X_K}{2}+\frac{X_H}{2}\right)}{V_\infty}\right]^{0.85}\cdot\int_{\frac{X_K}{\iota}}^{1}\left(\frac{V}{V_\infty}\right)^3 d\frac{X}{\iota}\cdot\left[\int\left(\frac{V}{V_\infty}\right)^4 d\frac{X}{\iota}\right]^{-0.2}}$$

Equation (26) shows that the Reynolds number does not enter into the problem when the boundary layer is fully turbulent. FIG. 6 shows for $X_K/\iota=0.6$, for f=0.2 and for $V_{S\infty}/V_\infty=1.5$, the dependency of the thrust amplification from $V_*/V_\infty$ and from $V_S/V_*$. If one The compression losses in the air flow supply channels can be transformed by calculation into an equivalent drag increase which has been estimated as follows $$\Delta C_{WP}/C_{WP} = 40(10 h_\infty/\iota)^3 \qquad (28)$$

whereby $h_\infty$ represents the fan air capturing cross-section per unit of wing span length. In connection with the nozzle configuration having uprightly extending nozzle slots, to which the present estimate is limited, there result additional losses due to friction on the nozzle fairings. This additional drag increase was estimated with Equation (29).

$$\Delta C_{WP}/C_{WP} = 10 h_\infty/\iota. \qquad (29)$$

The interference force calculated according to Equation (27) must be reduced by the drags according to Equations (28) and (29).

Figure 7:
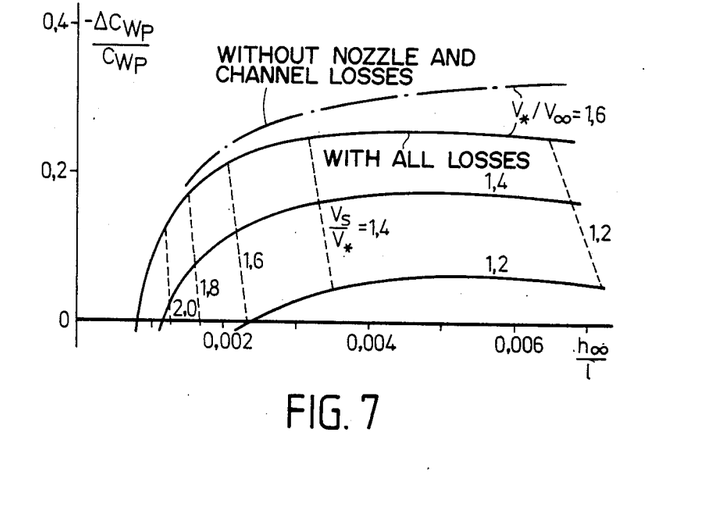
FIG. 7 is a diagram regarding the relative drag reduction as a function of the blown air volume.

FIG. 7 shows the function of the effective drag reduction $\Delta C_{WP}/C_{WP}$ from $h_\infty/\iota$ for three values of $V_*/V_\infty$. Due to the losses according to Equations (28) and (29), there exists one blowing air mass flow at which the effective interference force is maximized.

In general, modern transport aircraft are constructed so that during cruising flight the ratio $V_*/V_\infty$ has a value of 1.5. If one takes into account the stabilizing effect of blowing into the boundary layer, it may be possible to increase this value without difficulty to 1.6 with a corresponding increase in the wing thickness or in the lift coefficient. In that instance the maximum interference force corresponds to 26% of the drag on the suction side of the wing. In the light of these investigations, and in accordance with the structural features disclosed above, the fuel consumption is reduced by well over 5%. This is already a value 5 times larger than is considered to be economically feasible these days.

Although the invention has been described with reference to specific example embodiments, it will be appreciated that it is intended to cover all modifications and equivalents within the scope of the appended claims.

What is claimed is:

1. An aircraft wing having an upper wing surface and a lower wing surface, comprising low compression fan means (12) installed in said wing for producing a propulsion jet, longitudinal flow channel means (17) extending in a spanwise direction substantially along the entire length of said wing and arranged to receive said propulsion jet out of said fan means, a plurality of air blowing nozzles (19) arranged in a row in said upper wing surface where reduced pressure on said upper wing surface has its maximal value, said air blowing nozzles communicating with said flow channel means for blowing said propulsion jet through said air blowing nozzles, said air blowing nozzles having a height perpendicularly to said upper wing surface corresponding to less than the thickness of a boundary layer on said upper wing surface for directly and exclusively blowing said propulsion jet into said boundary layer on said upper wing surface in a zone along substantially the entire wing length where said reduced pressure on said upper wing surface has its maximal value for causing a substantially complete mixing of said propulsion jet with a boundary layer air flow substantially along the entire length of said wing entirely inside said boundary layer air flow, said air blowing nozzles having a width in said spanwise direction, said air blowing nozzles having a lower narrow edge formed directly by said upper wing surface so that contact between the respective propulsion jet and the wing surface is a fraction of the jet circumference defined by twice said nozzle height plus said lower narrow edge plus a respective narrow upper edge for reducing drag and for simultaneously assuring an intensive mixing of each jet with the boundary layer air flow exclusively within the boundary layer, whereby drag caused by said boundary layer is reduced.

2. The aircraft wing of claim 1, wherein said air blowing nozzles comprise a plurality of individual blowing slot nozzles (19) having long exit slots and arranged in a row on said upper surface of said wing in a spaced side by side relationship so that said long exit slots of said blowing slot nozzles extend substantially upright relative to said upper wing surface in said boundary layer and so that boundary layer flow passages are formed between adjacent blowing slot nozzles.

3. The aircraft wing of claim 1, further comprising air duct means extending through said wing from said lower wing surface forming a compression surface, to said upper wing surface forming a suction surface, said air duct means extending through said wing substantially along its entire wing length for detouring an air flow close to said lower wing surface through said wing to said upper wing surface substantially along its entire wing length.

4. The aircraft wing of claim 3, wherein said air duct means have an exit slot (22) in said upper wing surface, said exit slot extending in parallel to said air blowing nozzles substantially along the entire wing length.

5. The aircraft wing of claim 1, further comprising air guide vanes operatively arranged in said longitudinal flow channel means.

6. An aircraft wing having an upper wing surface and a lower wing surface, comprising low compression fan means (12) installed in said wing for producing a propulsion jet, longitudinal flow channel means (17) extending in a spanwise direction substantially along the entire length of said wing and arranged to receive said propulsion jet out of said fan means, air blowing nozzle means (20) arranged in said upper wing surface where reduced pressure on said upper wing surface has its maximal value, said air blowing nozzle means communicating with said flow channel means for blowing said propulsion jet through said air blowing nozzle means directly into a boundary layer on said upper wing surface in a zone along substantially the entire wing length where said reduced pressure on said upper wing surface has its maximal value, said wing further comprising air guide duct means (21) extending through said wing from said lower wing surface forming a compression surface, to said upper wing surface forming a suction surface, said air guide duct means extending through said wing substantially along its entire wing length for detouring an air flow close to said lower wing surface through said wing to said upper wing surface substantially along its entire wing length, said air guide duct means having a substantially uninterrupted exit slot (22) in said upper wing surface, said substantially uninterrupted exit slot (22) extending vertically below and in parallel to said air blowing nozzle means (20) substantially along the entire wing length, said air blowing nozzle means and said exit slot together having a height above said upper wing surface corresponding to less than the thickness of a boundary layer on said upper wing surface, said height being just sufficient for blowing said propulsion jet exclusively into said boundary layer for assuring a substantially complete mixing of said propulsion jet with a boundary layer air flow substantially along the entire length of said wing and entirely inside said boundary layer air flow, said exit slot (22) providing an air layer between said upper wing surface and said propulsion jet, said air layer having a flow speed lower than said propulsion jet for separating said propulsion jet mixing with said boundary layer air flow from said upper wing surface to reduce drag.

7. An aircraft wing having an upper wing surface and a lower wing surface, comprising low compression fan means (12) installed in said wing for producing a propulsion jet, longitudinal flow channel means (17) extending in a spanwise direction substantially along the entire length of said wing and arranged to receive said propulsion jet out of said fan means, a long narrow slot forming an air blowing nozzle (19) arranged in said upper wing surface where reduced pressure on said upper wing surface has its maximal value, said air blowing nozzle communicating with said flow channel means for blowing said propulsion jet through said air blowing nozzle, said air blowing nozzle having a height perpendicularly to said upper wing surface corresponding to less than the thickness of a boundary layer on said upper wing surface for directly and exclusively blowing said propulsion jet into said boundary layer on said upper wing surface in a zone along substantially the entire wing length where said reduced pressure on said upper wing surface has its maximal value for causing a substantially complete mixing of said propulsion jet with a boundary layer air flow substantially along the entire length of said wing entirely inside said boundary layer air flow, said air blowing nozzle having a width in said spanwise direction, said air blowing nozzle having a lower narrow edge formed directly by said upper wing surface so that contact between the respective propulsion jet and the wing surface is a fraction of the jet circumference defined by twice said nozzle height plus said lower narrow edge plus a respective narrow upper edge for reducing drag and for simultaneously assuring an intensive mixing of each jet with the boundary layer air flow exclusively within the boundary layer, whereby drag caused by said boundary layer is reduced, said wing further comprising an air duct extending from said lower wing surface to said upper wing surface, said air duct having an exit slot formed in said upper wing surface, said exit slot forming a second long narrow slot extending in parallel to said air blowing nozzle substantially along the entire wing length.

* * * * *